(12) United States Patent
Kuroshita

(10) Patent No.: US 8,976,811 B2
(45) Date of Patent: Mar. 10, 2015

(54) COMMUNICATION APPARATUS, COMMUNICATION SYSTEM AND COMMUNICATION METHOD

(75) Inventor: Kazumasa Kuroshita, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 249 days.

(21) Appl. No.: 13/609,859

(22) Filed: Sep. 11, 2012

(65) Prior Publication Data

US 2013/0107734 A1 May 2, 2013

(30) Foreign Application Priority Data

Oct. 28, 2011 (JP) ................. 2011-237766

(51) Int. Cl.
| | |
|---|---|
| *H04J 3/16* | (2006.01) |
| *H04W 28/02* | (2009.01) |
| *H04W 28/20* | (2009.01) |
| *H04L 12/24* | (2006.01) |
| *H04L 12/911* | (2013.01) |
| *H04L 12/26* | (2006.01) |
| *H04L 5/00* | (2006.01) |
| *H04L 12/917* | (2013.01) |
| *H04W 4/00* | (2009.01) |

(52) U.S. Cl.
CPC .......... *H04W 28/0215* (2013.01); *H04W 28/20* (2013.01); *H04L 5/0058* (2013.01); *H04L 41/0896* (2013.01); *H04W 28/0284* (2013.01); *H04L 5/0064* (2013.01); *H04W 28/0289* (2013.01); *H04W 28/0231* (2013.01); *H04L 47/783* (2013.01); *H04L 47/76* (2013.01); *H04W 28/0268* (2013.01); *H04L 43/0888* (2013.01); *H04L 43/16* (2013.01); *H04W 4/005* (2013.01)
USPC ......................................................... 370/468

(58) Field of Classification Search
CPC . H04L 5/0058; H04L 5/0064; H04L 41/0896; H04L 47/76; H04L 47/783; H04L 43/0888; H04L 43/16; H04W 28/0231; H04W 28/0268; H04W 28/0284; H04W 28/0289; H04W 28/18; H04W 28/20; H04W 28/22
USPC .................................. 370/407, 408, 425, 468
See application file for complete search history.

(56) References Cited

U.S. PATENT DOCUMENTS

| | | | | |
|---|---|---|---|---|
| 2003/0043741 | A1* | 3/2003 | Mukai et al. | 370/229 |
| 2004/0105415 | A1* | 6/2004 | Fujiwara et al. | 370/338 |
| 2004/0233932 | A1* | 11/2004 | Ohmi | 370/468 |
| 2007/0189330 | A1 | 8/2007 | Ohmi | |

FOREIGN PATENT DOCUMENTS

| | | |
|---|---|---|
| JP | 2006-526372 | 11/2006 |
| WO | WO 2004/105330 A2 | 12/2004 |

* cited by examiner

*Primary Examiner* — Peter Cheng
(74) *Attorney, Agent, or Firm* — Staas & Halsey LLP

(57) ABSTRACT

A communication apparatus includes: a storage section to store a communication throughput of communication apparatuses, a reference value of the communication throughput and a reference adjustment value; a calculating section, when a current communication throughput of a self-sided communication apparatus exceeds a self reference value, to calculate a reference value of the communication apparatuses based on an upper limit value, the current communication throughput, and the communication throughput and the reference adjustment value in the storage section, the upper limit value corresponding to a total communication throughput of the communication apparatuses; an updating section to update the reference value with the calculated reference value in the communication apparatuses; a transmitter section to transmit the calculated reference value to an external communication apparatus; and a receiver section to receive the calculated reference value transmitted from the external communication apparatus and update the reference value with the calculated reference value.

13 Claims, 15 Drawing Sheets

FIG. 4

| DESTINATION IP ADDRESS | START TIME | END TIME | THROUGHPUT OF TRANSMITTED DATA | THROUGHPUT OF RECEIVED DATA |
|---|---|---|---|---|
| 10.10.10.10 | YYYYMMDDhhmmss | YYYYMMDDhhmmss | 859375 | 265625 |
| 10.10.10.10 | YYYYMMDDhhmmss | YYYYMMDDhhmmss | 782226 | 203125 |
| 10.10.10.10 | YYYYMMDDhhmmss | YYYYMMDDhhmmss | 493408 | 640625 |

FIG. 5

| NODE NAME | DATA UPDATE TIME | THROUGHPUT OF TRANSMITTED DATA | LIMIT VALUE | SAFETY FACTOR |
|---|---|---|---|---|
| NODE A | YYYYMMDDhhmmss | 226318 | 800000 | 0.5 |
| NODE B | YYYYMMDDhhmmss | 626953 | 1000000 | 0.5 |
| NODE C | YYYYMMDDhhmmss | 359863 | 1000000 | 0.8 |
| NODE D | YYYYMMDDhhmmss | 328125 | 800000 | 0.5 |
| NODE E | YYYYMMDDhhmmss | 359863 | 800000 | 0.5 |

FIG. 14

| ALARM/LOG TYPE | IDENTIFIER | SAFETY FACTOR |
|---|---|---|
| ALARM (Alert) | Alert | LEVEL 3 (1.0) |
| ALARM (Warning) | Warning | LEVEL 2 (0.8) |
| ALARM (Info) | Info | LEVEL 1 (0.5) |
| LOG LEVEL 1 | Loglevel1 | LEVEL 3 (1.0) |
| LOG LEVEL 2 | Loglevel2 | LEVEL 2 (0.8) |
| LOG LEVEL 3 | Loglevel3 | LEVEL 1 (0.5) |
| LOG LEVEL 4 | Loglevel4 | LEVEL 1 (0.5) |
| OTHER DATA | | LEVEL 1 (0.5) |

FIG. 15

| ALARM/LOG TYPE | IDENTIFIER | SAFETY FACTOR | LEVEL 1 (0.5) | LEVEL 2 (0.8) | LEVEL 3 (1.0) |
|---|---|---|---|---|---|
| ALARM (Alert) | Alert | LEVEL 3 (1.0) | TRANSMIT | TRANSMIT | TRANSMIT |
| ALARM (Warning) | Warning | LEVEL 2 (0.8) | TRANSMIT | TRANSMIT | DON'T TRANSMIT |
| ALARM (Info) | Info | LEVEL 1 (0.5) | TRANSMIT | DON'T TRANSMIT | DON'T TRANSMIT |
| LOG LEVEL 1 | Loglevel1 | LEVEL 3 (1.0) | TRANSMIT | TRANSMIT | TRANSMIT |
| LOG LEVEL 2 | Loglevel2 | LEVEL 2 (0.8) | TRANSMIT | TRANSMIT | DON'T TRANSMIT |
| LOG LEVEL 3 | Loglevel3 | LEVEL 1 (0.5) | TRANSMIT | DON'T TRANSMIT | DON'T TRANSMIT |
| LOG LEVEL 4 | Loglevel4 | LEVEL 1 (0.5) | TRANSMIT | DON'T TRANSMIT | DON'T TRANSMIT |
| OTHER DATA | | LEVEL 1 (0.5) | TRANSMIT | DON'T TRANSMIT | DON'T TRANSMIT |

COMMUNICATION APPARATUS, COMMUNICATION SYSTEM AND COMMUNICATION METHOD

CROSS-REFERENCE TO RELATED APPLICATION(S)

This application is based upon and claims the benefit of priority of the prior Japanese Patent Application No. 2011-237766, filed on Oct. 28, 2011, the entire contents of which are incorporated herein by reference.

FIELD

The embodiment discussed herein is related to a communication apparatus, a communication system and a communication method in a network.

BACKGROUND

An M2M (Machine-to-Machine) system is automatically controlled in such a way that machines, or a machine and an information system, coupled to a network exchange information with each other without a human operation.

The M2M system includes a plurality of machines each equipped with a communication apparatus to be an M2M terminal, and the plural machines exchange information with the information system.

Japanese National Publication of International Patent Application No. 2006-526372 discusses a related art.

SUMMARY

According to one aspect of the embodiments, a communication apparatus includes: a storage section configured to store a communication throughput of each of a plurality of communication apparatuses, a reference value of the communication throughput and a reference adjustment value to adjust the reference value; a calculating section configured, when a current communication throughput between a self-sided communication apparatus and a center apparatus exceeds a self reference value, to calculate a reference value of each of the plurality of communication apparatuses based on an upper limit value, the current communication throughput, and the communication throughput and the reference adjustment value in the storage section, the upper limit value corresponding to a total communication throughput of the plurality of communication apparatuses; an updating section configured to update the reference value in the storage section with the calculated reference value in the plurality of communication apparatuses; a transmitter section configured to transmit the calculated reference value to an external communication apparatus; and a receiver section configured to receive the calculated reference value transmitted from the external communication apparatus and update the reference value in the storage section with the calculated reference value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 depicts an exemplary transmitted/received record storage section;
FIG. 5 depicts an exemplary limit value table;
FIG. 14 depicts an exemplary data transmission decision table;
and
FIG. 15 depicts an exemplary identifier.

DESCRIPTION OF EMBODIMENT

An upper limit to a total communication throughput of all M2M terminals in an M2M system is set for a certain period of time to use a network. The M2M system may employ a rate schedule in which charges for network use for communication are significantly raised if a total communication throughput exceeds the upper limit.

Thus, the M2M terminals may notify each other of their communication throughput and adjust the communication throughput with each other in order that the total communication throughput remains lower than the upper limit.

A terminal station generates a packet including transmission information based on size of data in a buffer portion and the data, and transmits the packet to an external terminal station. A control station receives the packet transmitted by the terminal station, and decides whether a currently allotted frequency band is to be changed or not based on the transmission information obtained from the received packet. Upon changing the frequency band, the control station transmits a packet to notify the terminal station and the external terminal station of a new frequency band.

If, e.g., the number of terminal stations increases, a load of the control station may increase. The control station changes allotments of frequency bands and does not reduce communication throughput. Thus, the control station may fail to control the total throughput in the M2M system so as to keep it lower than the upper limit.

Figure 1:
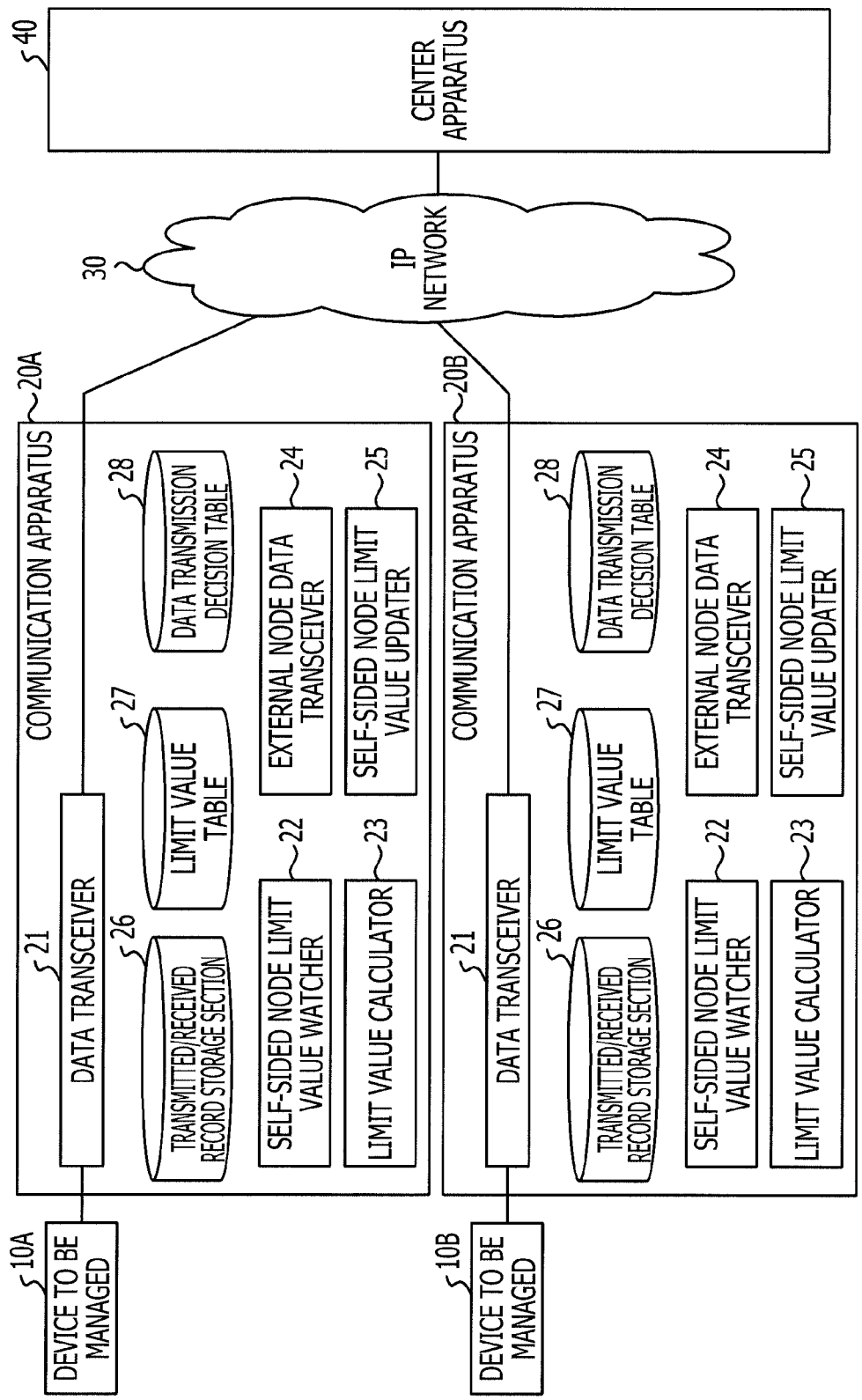
FIG. 1 depicts an exemplary M2M system.

FIG. 1 depicts an exemplary M2M system. To-be managed devices 10A and 10B illustrated in FIG. 1 are coupled to communication apparatuses 20A and 20B as M2M terminals, respectively, via a Local Area Network (LAN) cable or a serial communication line. The communication apparatuses each may be referred as a node.

The to-be-managed devices 10A and 10B may be, e.g., a machine tool for manufacturing mechanical parts. The managed 10A and 10B devices packetize a log of kinds and quantities of manufactured mechanical parts or information such as operation conditions, alarms, etc. The to-be-managed devices 10A and 10B provide the communication apparatuses 20A and 20B, respectively, with a packet to notify a center apparatus 40 of the information.

The communication apparatuses 20A and 20B each include a data transceiver 21, a self-sided node limit value watcher 22, a limit value calculator 23, an external node data transceiver 24, a self-sided node limit value updater 25, a transmitted/received record storage section 26, a limit value table 27 and a data transmission decision table 28.

The data transceiver 21 is coupled to the to-be-managed devices (10A, 10B, etc.) and transmits and receives data to and from the to-be-managed devices. The data transceiver 21 is coupled to an IP (Internet Protocol) network 30. The data transceiver 21 decides whether packetized transmission data received from the to-be-managed device is allowed to be transmitted. The data transceiver 21 transmits the packetized transmission data to the center apparatus 40 via the IP network 30. The data transceiver 21 decides whether the packetized transmission data is allowed to be transmitted based on an identifier included in the transmission data. The data transceiver 21 replies to a packet transmitted from the center apparatus 40.

The data transceiver 21 obtains an identifier which indicates transmission from the data transmission decision table 28. If an identifier which indicates transmission is present in transmission data received from the to-be-managed device, the data transceiver 21 transmits the transmission data to the center apparatus 40.

The self-sided node limit value watcher 22 compares a total throughput of data transmitted by the self-sided node stored in the transmitted/received record storage section 26 with a limit value of the self-sided node stored in the limit value table 27. The limit value may be a reference value of communication throughput. If the total throughput of data transmitted by the self-sided node exceeds the limit value of the self-sided node, the self-sided node limit value watcher 22 requests one or a plurality of external nodes stored in the limit value table 27 to notify the self-sided node of a limit value and a throughput of transmitted data.

The self-sided node limit value watcher 22 provides the limit value calculator 23 with the limit value and the throughput of transmitted data, which have been notified by one or more of the external nodes, and the limit value and the (total) throughput of transmitted data of the self-sided node, so as to make the limit value calculator 23 calculate limit values of the self-sided node and the external nodes. The self-sided node limit value watcher 22 provides the self-sided node limit value updater 25 with the limit values of the self-sided node and the external nodes calculated by the limit value calculator 23, so as to make the self-sided node limit value updater 25 update the limit value table 27.

The limit value calculator 23 calculates the limit values of the self-sided node and the external nodes based on the limit value and the throughput of transmitted data received from one or more of the external nodes provided by the self-sided node limit value watcher 22, and the limit value and the throughput of transmitted data of the self-sided node, and returns the calculation result to the self-sided node limit value watcher 22.

The external node data transceiver 24 transmits and receives data such as a limit value and a throughput of transmitted data to and from a communication apparatus of an external node, e.g., by using a Wireless LAN (WLAN). The external node data transceiver 24 provides the self-sided node limit value watcher 22 with limit values of the self-sided node and the external nodes received from an external node.

A list of a communication apparatus to be an external node when the external node data transceiver 24 transmits and receives data may be set in advance, or may be dynamically updated by the use of technologies of ad hoc communication. The communication apparatuses each have functions of a router, an L3 switch, etc., and independently perform routing operations in the ad hoc communication. Therefore, a coverage of data exchange of the external node data transceiver 24 may expand so as to communicate with a communication apparatus located far from the self-sided node.

The self-sided node limit value updater 25 stores the limit values of the self-sided node and the external nodes calculated by the limit value calculator 23 and provided by the self-sided node limit value watcher 22 in the limit value table 27, so as to update the limit value table 27.

History data of data exchange with the center apparatus 40 is stored in the transmitted/received record storage section 26. The limit values of the self-sided node and the external nodes are stored in the limit value table 27.

An identifier and a margin rate are set in the data transmission decision table 28 according to an alarm and a log type of a packet from the device to be managed. The margin rate may be a criterion in deciding whether the packet from the to-be-managed device is to be transmitted to the center apparatus 40.

The communication apparatuses 20A and 20B depicted in FIG. 1 may be configured to transmit a packet received from the to-be-managed device 10A and from the to-be-managed device 10B, respectively, to the center apparatus 40 by means of the data transceiver 21 independently from each other. The communication apparatus 20B provided next to the to-be-managed 10A may transmit a packet received from the to-be-managed device 10B to the communication apparatus 20A by using the external node data transceiver 24. The communication apparatus 20A may be configured to transmit a packet received from the adjacent to-be-managed device 10B, etc., with a packet received from the to-be-managed device 10A by the self-sided node collectively to the center apparatus 40 by means of the data transceiver 21.

Figure 2:
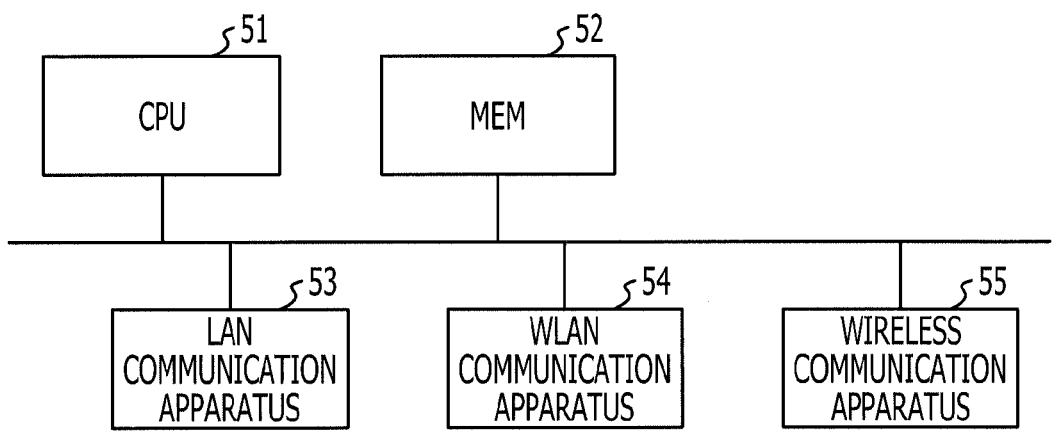
FIG. 2 depicts an exemplary communication apparatus.

FIG. 2 depicts an exemplary communication apparatus. FIG. 2 may depict a hardware constitution of the communication apparatus 20A or 20B. The communication apparatus 20A depicted in FIG. 2 includes a CPU 51, a memory (MEM) 52, a LAN communication apparatus 53, a WLAN communication apparatus 54 and a wireless communication apparatus 55. The apparatuses from the CPU 51 to the wireless communication apparatus 55 are coupled with one another.

The CPU 51 runs data processing programs stored in the memory 52 to transmit and receive data, to watch a self-sided node limit value, to calculate a limit value, to transmit and receive data to and from an external node, or to update a self-sided node limit value. The data processing programs are executed so that the data transceiver 21, the self-sided node limit value watcher 22, the limit value calculator 23, the external node data transceiver 24 and the self-sided node limit value updater 25 depicted in FIG. 1 work.

The memory 52 includes a ROM in which a data processing program is stored, a RAM to be used as a working area, and a non-volatile memory such as a flash memory in which data is stored. The transmitted/received record storage section 26 works on the non-volatile memory in the memory 52, and so does the limit value table 27 and the data transmission decision table 28.

The LAN communication apparatus 53 is coupled, e.g., to a LAN communication apparatus in the device to be managed 10A, and transmits and received data to and from the to-be-managed device. The LAN communication apparatus 53 may correspond to a portion of the data transceiver 21 depicted in FIG. 1.

The WLAN communication apparatus 54 is coupled by wireless to an external apparatus, for example, a WLAN communication apparatus as an external node, and performs wireless communication including ad hoc communication.

The WLAN communication apparatus 54 may correspond to the external node data transceiver 24 depicted in FIG. 1.

The wireless communication apparatus 55 is coupled to a wireless base station in a mobile communication system and performs wireless communication, so as to be coupled to the center apparatus 40 via the IP network 30 and to perform data communication. The wireless communication apparatus 55 may correspond to a portion of the data transceiver 21.

Figure 3:
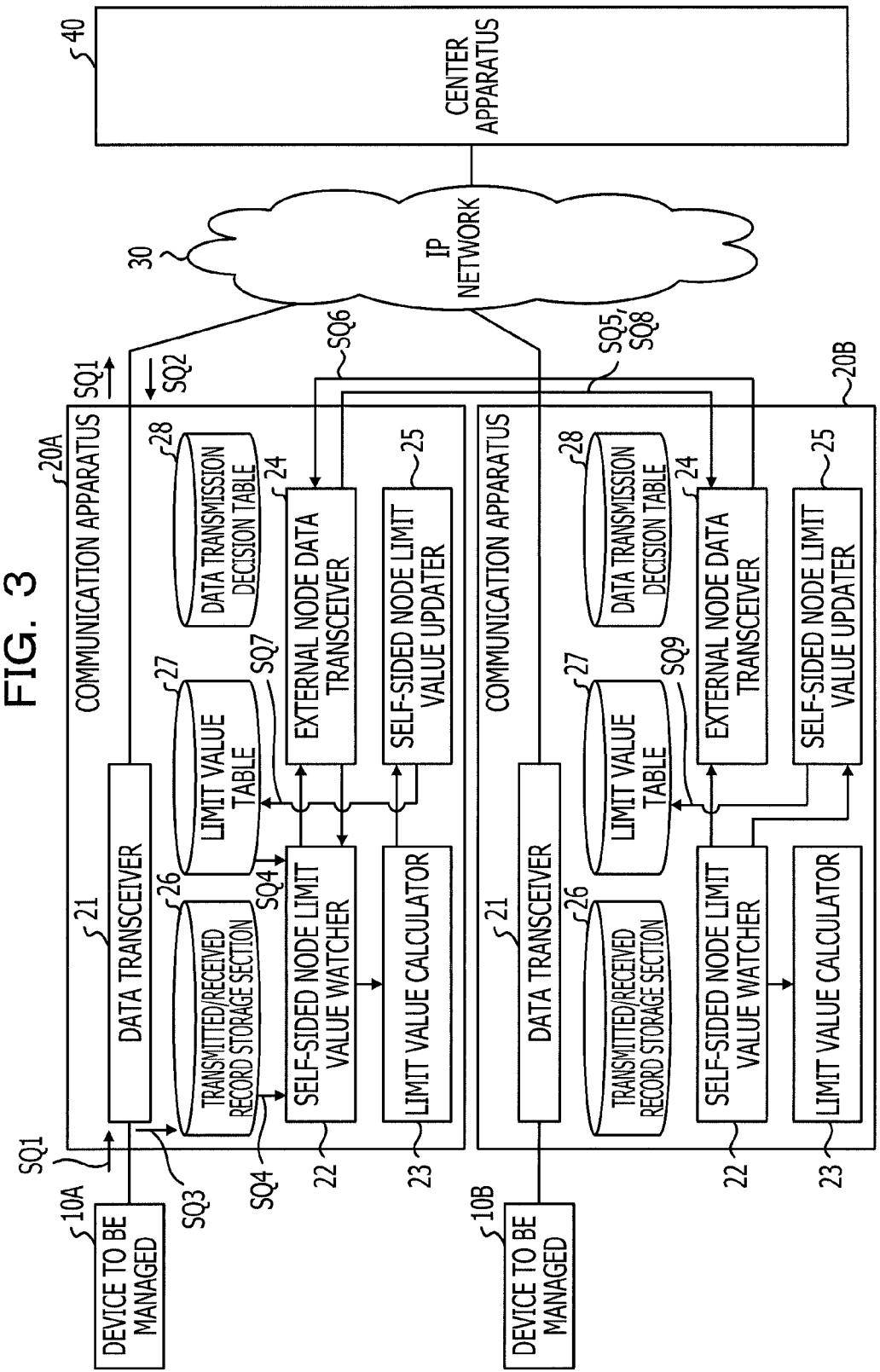
FIG. 3 depicts an exemplary process to of a M2M system.

FIG. 3 illustrates an exemplary data process operation of a M2M system. The to-be-managed device 10A depicted in FIG. 3 transmits a packet including information of a log, an alarm, etc. to the center apparatus 40 via the communication apparatus 20A (sequence SQ1). The center apparatus 40 transmits a reply to the to-be-managed device 10A via the communication apparatus 20A so as to transmit and receive data (sequence SQ2).

Upon finishing transmitting and receiving data, the data transceiver 21 in the communication apparatus 20A stores throughput values of transmitted data and received data in the transmitted/received record storage section 26 (sequence SQ3).

FIG. 4 depicts an exemplary transmitted/received record storage section. As depicted in FIG. 4, the throughput of transmitted data and received data are stored in associated with a destination IP address, time when transmission starts and time when transmission ends. The throughput of transmitted data and received data may be expressed, e.g., in the number of bytes or in the number of packets. What is stored in the transmitted/received record storage section 26 is reset by the self-sided node limit value watcher 22 each time a charge period ends, e.g., every month. The throughput of transmitted data and received data may thereby be easily managed.

The self-sided node limit value watcher 22 compares a sum of throughput of data transmitted by the self-sided node, i.e., a communication throughput stored in the transmitted/received record storage section 26 with a self-sided node limit value stored in the limit value table 27 (sequence SQ4).

If the sum of the throughput of data transmitted by the self-sided node, e.g., the communication throughput, exceeds the self-sided node limit value, the self-sided node limit value watcher 22 requests an external node which is listed in the limit value table 27, e.g., the communication apparatus 20B, to notify the self-sided node from the external node data transceiver 24 of a limit value, a (total) throughput of transmitted data and a margin rate (sequence SQ5). The sum of the throughput of data transmitted by the self-sided node is the communication throughput to be compared with the limit value. The throughput of received data may be added to the throughput of transmitted data, and the sum of the throughput of data transmitted and received by the self-sided node may be the communication throughput to be compared with the limit value.

FIG. 5 depicts an exemplary limit value table. As depicted in FIG. 5, a node name of a packet self-sided node and a node name of an external node which transmits and receives data to and from the self-sided node by using the external node data transceiver 24, e.g., a name of the communication apparatus (or maybe an address of the external node) are stored. Time when data is updated, the (total) throughput of transmitted data, the limit value and the margin rate are stored for every node name. The margin rate may be a value for adjusting the limit value, and may be referred as a reference adjustment value.

The nodes depicted in FIG. 5 each keeps a distinctive margin rate, receive the limit value, the (total) throughput of transmitted data and the margin rate, and calculate the limit value for every node. An upper limit may be stored in the limit value table 27, although not depicted in FIG. 5. The upper limit may be set to a total throughput of data transmitted by all the communication apparatuses in the M2M system for a certain period of time. If the total throughput of communication for a certain period of time exceeds the upper limit, charges for use of communication may be raised.

Upon receiving a request from the communication apparatus 20A for notification of the limit value and the throughput of transmitted data, the communication apparatus 20B as an external node reads the self-sided node limit value and the (total) throughput of transmitted data from the limit value table 27, and transmits what is read via the external node data transceiver 24 back to the communication apparatus 20A (sequence SQ6).

If the communication apparatuses 20A and 20B are installed so apart from each other that the external node data transceiver 24 is unable to transmit or receive data, the data transmission and reception may be performed via the IP network 30 by the use of the data transceiver 21.

The sequence SQ5 and the sequence SQ6 may be omitted. As latest (total) throughput of transmitted data is obtained from every node if the sequences SQ5 and SQ6 are executed, the limit values of the self-sided node and the external node may be exactly calculated in a next sequence SQ7.

The self-sided node limit value watcher 22 in the communication apparatus 20A makes the limit value calculator 23 calculate the limit values of the self-sided node and the external node based on the (total) throughput of transmitted data and the margin rate from the communication apparatus 20B, and of the (total) throughput of transmitted data and the margin rate of the self-sided node. The self-sided node limit value watcher 22 makes the self-sided node limit value updater 25 update the limit value table 27 on the calculated limit values of the self-sided and external nodes (sequence SQ7).

The self-sided node limit value watcher 22 instructs the communication apparatus 20B as the external node via the self-sided node limit value updater 25 to update the limit value table 27 with the calculated limit values of the self-sided and external nodes (sequence SQ8).

The communication apparatus 20B receives the instructions from the communication apparatus 20A by means of the external node data transceiver 24, and provides the self-sided node limit value watcher 22 with the instructions. The self-sided node limit value watcher 22 in the communication apparatus 20B provides the self-sided node limit value updater 25 with the limit values of the self-sided node and the external nodes received from the communication apparatus 20A, and makes the self-sided node limit value updater 25 update the limit value table 27 (sequence SQ9).

Figure 6:
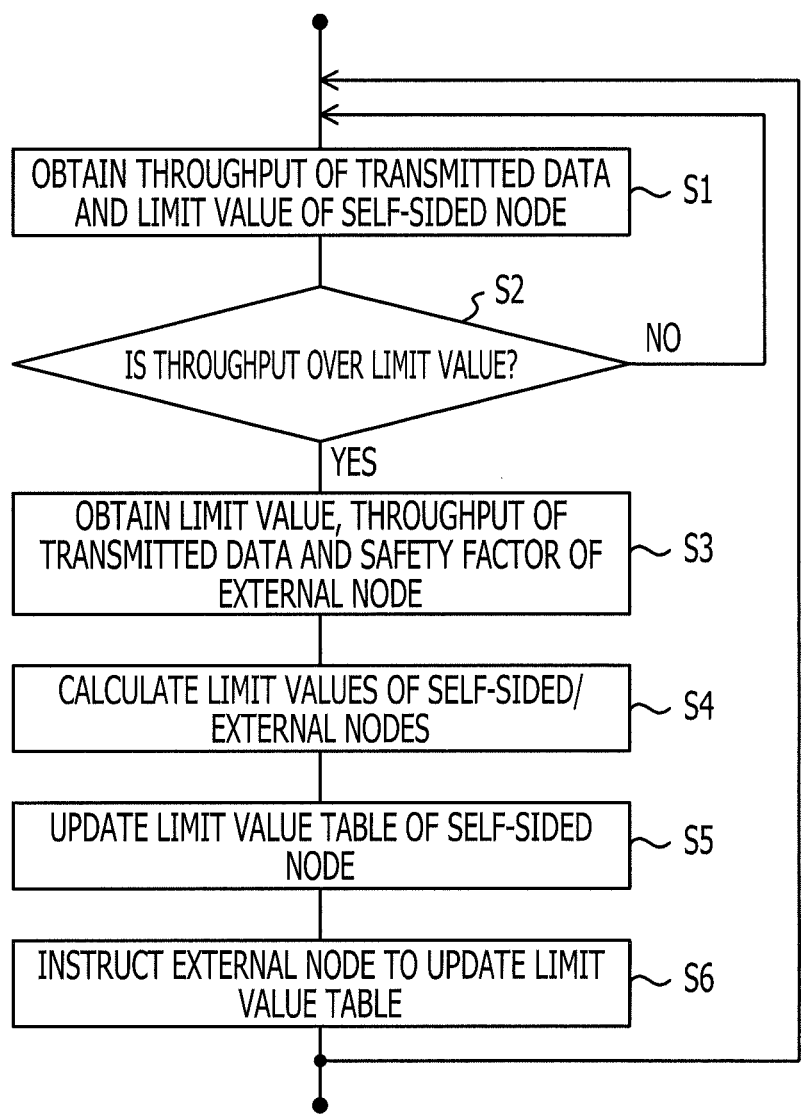
FIG. 6 depicts an exemplary process of a self-sided node limit value watcher.

FIG. 6 depicts an exemplary process of a self-sided node limit value watcher. The process depicted in FIG. 6 may be a process performed by the self-sided node limit value watcher 22 in the communication apparatus 20A as the self-sided node illustrated in FIG. 3. The self-sided node limit value watcher 22 obtains, in an operation S1, the total throughput of data transmitted by the self-sided node to be stored in the transmitted/received record storage section 26 and the limit value of the self-sided node stored in the limit value table 27.

The self-sided node limit value watcher 22 decides whether the total throughput of transmitted data exceeds the limit value of the self-sided node in an operation S2. Unless the total throughput of transmitted data exceeds the limit value of the self-sided node, the process goes to the operation S1. If the total throughput of transmitted data exceeds the limit value of the self-sided node, the self-sided node limit value watcher 22 obtains the limit value, the (total) throughput of transmitted data and the margin rate of the external node by using the external node data transceiver 24 in an operation S3.

The self-sided node limit value watcher 22 makes the limit value calculator 23 calculate limit values of the self-sided node and the external nodes based on the limit value and the throughput of transmitted data received from the external node and the throughput of transmitted data and the margin rate of the self-sided node (tonal) in an operation S4. The self-sided node limit value watcher 22 makes the self-sided node limit value updater 25 update the limit value table 27 with the calculated limit values of the self-sided and external nodes as an operation S5.

The self-sided node limit value watcher 22 transmits instructions to update the calculated limit values of the self-sided node and the external nodes, the (total) throughput of transmitted data and the margin rate to every external node via the external node data transceiver 24, and makes each of the external nodes update the limit value table 27 in an operation S6. The process goes to the operation S1 and the operations S1 through S6 are repeated.

Figure 7:
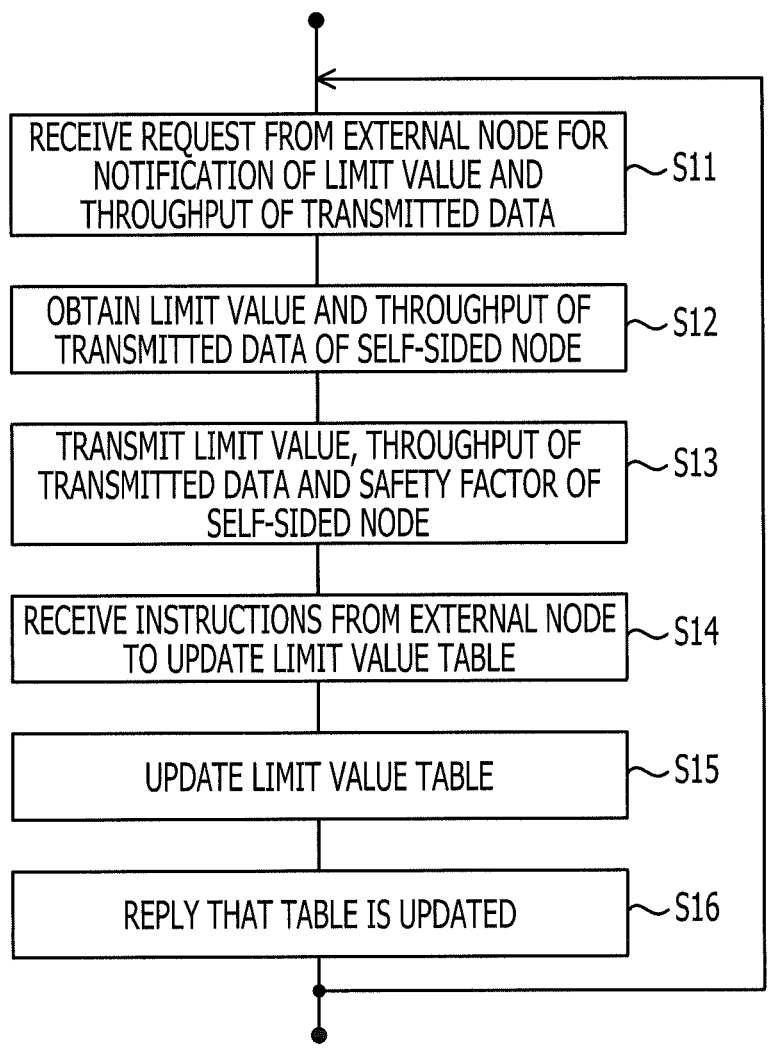
FIG. 7 depicts an exemplary process of a self-sided node limit value watcher.

FIG. 7 depicts an exemplary process of a self-sided node limit value watcher. The process depicted in FIG. 7 may be a process which is performed by the self-sided node limit value watcher 22 in the communication apparatus 20B as the external node illustrated in FIG. 3. The process depicted in FIG. 7 may be started upon receiving a request from the external node for notification of the limit value and the throughput of transmitted data.

The external node data transceiver 24 receives a request from the external node for notification of the limit value and the throughput of transmitted data in an operation S11.

The self-sided node limit value watcher 22 reads the limit value, the (total) throughput of transmitted data and the margin rate of the self-sided node from the limit value table 27 in an operation S12. The self-sided node limit value watcher 22 transmits the data read from the external node data transceiver 24 to the communication apparatus 20A in an operation S13.

The self-sided node limit value watcher 22 receives instructions to update the limit values of the self-sided node and the external nodes in an operation S14. The self-sided node limit value watcher 22 updates the limit value table 27 with the received limit values of the self-sided and external nodes, a (total) throughput of data and the margin rate in an operation S15.

The self-sided node limit value watcher 22 replies that the table is fully updated in an operation S16. The process goes to the operation S11 and the operations S11 through S16 are repeated. The operation S16 may be omitted.

If equal values are set to margin rates of all transmitters, the communication apparatuses may omit to transmit and receive the margin rates to and from one another.

Figure 8:
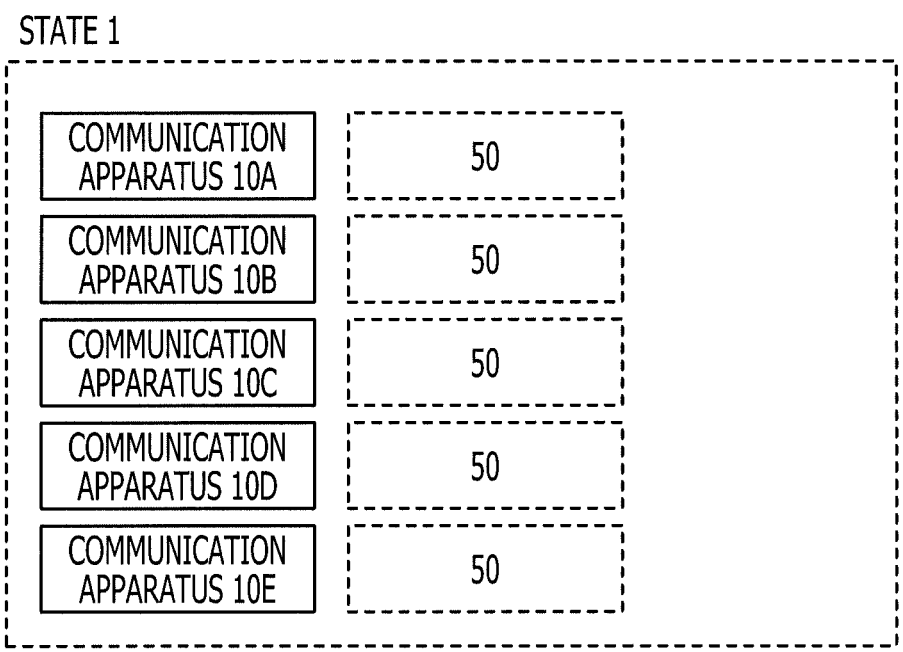
FIG. 8 depicts an exemplary limit value and an exemplary transmitted data amount.
Figure 9:
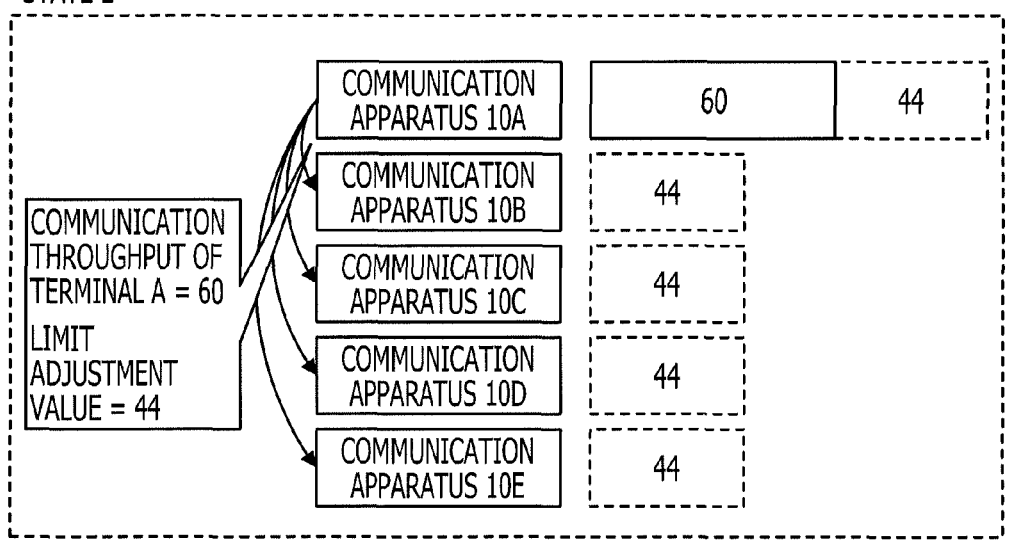
FIG. 9 depicts an exemplary limit value and an exemplary transmitted data amount.
Figure 10:
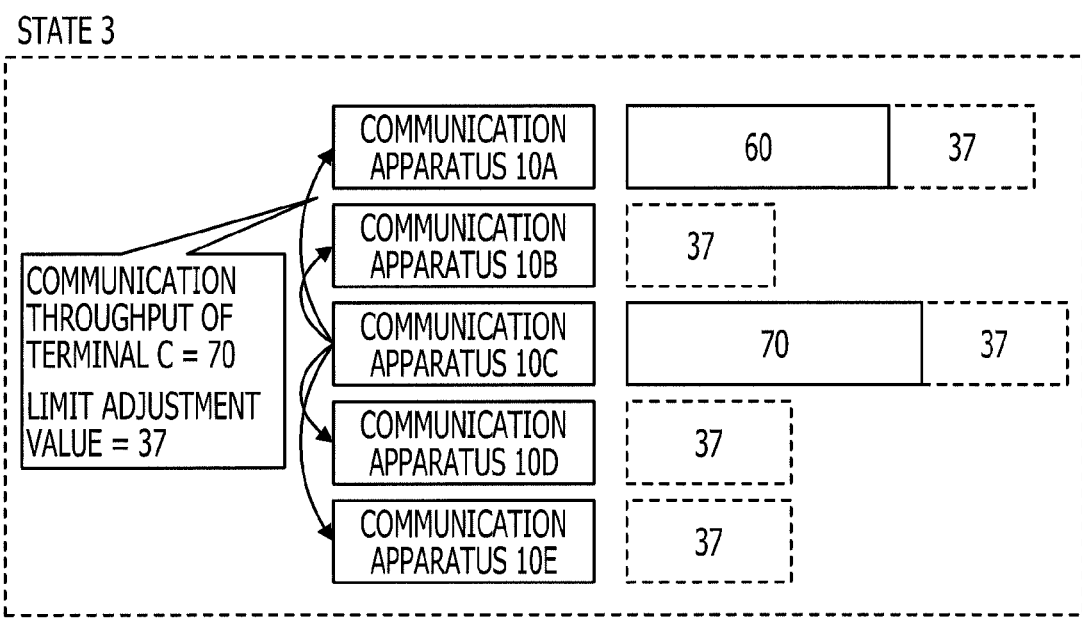
FIG. 10 depicts an exemplary limit value and an exemplary transmitted data amount.

FIGS. 8-10 illustrate an exemplary limit value and an exemplary throughput of transmitted data. FIGS. 8-10 may indicate state transitions of limit values and (total) throughput values of data transmitted by a plurality of communication apparatuses 10A-10E. An upper limit of (total) throughput of data transmitted by the communication apparatuses 10A-10E for a certain period of time, e.g., one month may be set to 500. If the throughput exceeds the upper limit, charges for network use may be raised. Margin rates of the respective communication apparatuses each may be 0.5.

FIG. 8 depicts an initial state (state 1) in which none of the communication apparatuses 10A-10E performs data communication. The limit value R of each of the communication apparatuses is calculated according to a following equation (1) by the use of a margin X of the throughput of transmitted data for the upper limit, the number Y of the communication apparatuses and the margin rate Z.

$$R = (X/Y) \times Z \quad (1)$$
$$= [(500-0)/5] \times 0.5$$
$$= 50$$

Data communication of a throughput value 60 of transmitted data may occur on the communication apparatus 10A in the state 1. The limit value calculator 23 in the communication apparatus 10A calculates limit values of the self-sided and external nodes by using the equation (1). The communication apparatuses 10A-10E may shift to a state 2 depicted in FIG. 9.

$$R = [(500-60)/5] \times 0.5$$
$$= 44$$

Data communication of a throughput value 70 of transmitted data may occur on the communication apparatus 10C in the state 2. The limit value calculator 23 in the communication apparatus 10C calculates limit values of the self-sided node and the external nodes by using the equation (1). The communication apparatuses 10A-10E shift to a state 3 depicted in FIG. 10.

$$R = [(500-130)/5] \times 0.5$$
$$= 37$$

Figure 11:
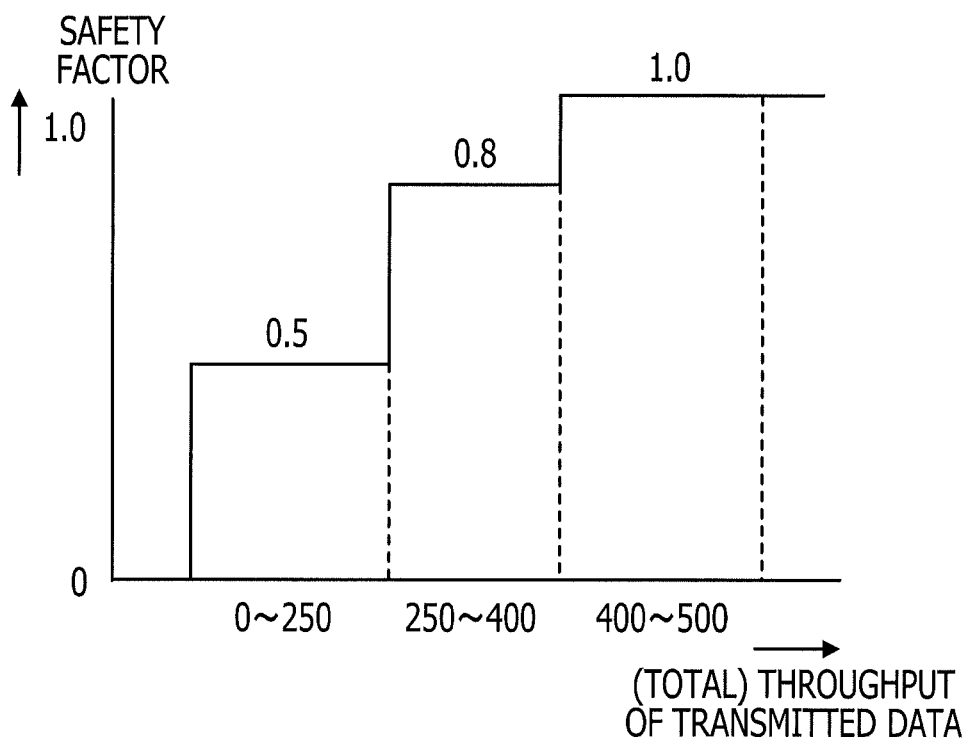
FIG. 11 depicts an exemplary change in a margin rate.

The margin rates of the communication apparatuses depicted in FIGS. 8-10 each may be fixed to 0.5, or may be variably set based on the total throughput of data transmitted by the communication apparatuses 10A-10E. FIG. 11 depicts an exemplary change in a margin rate. FIG. 11 depicts a change in the margin rate with respect to the total throughput of transmitted data. As depicted in FIG. 11, the total throughput of transmitted data being 0 through 250 corresponds to a level 1 and the margin rate is set to 0.5. The total throughput of transmitted data being 250 through 400 corresponds to a level 2 and the margin rate is set to 0.8. The total throughput of transmitted data being 400 through 500 or greater than 500 corresponds to a level 3 and the margin rate is set to 1.0.

As the total throughput of transmitted data increases, the margin rate of each of the communication apparatuses increases and the limit value becomes closer to the upper limit.

A number of the margin rates may be four or more levels. The margin rate may be preset for every level by the limit value calculator 23 of each of the communication apparatuses. The center apparatus 40 may change the setting of the margin rate for every level and every communication apparatus. The number of margin rates or the margin rates for each of the levels may be different for each of the communication apparatuses.

Figure 12:
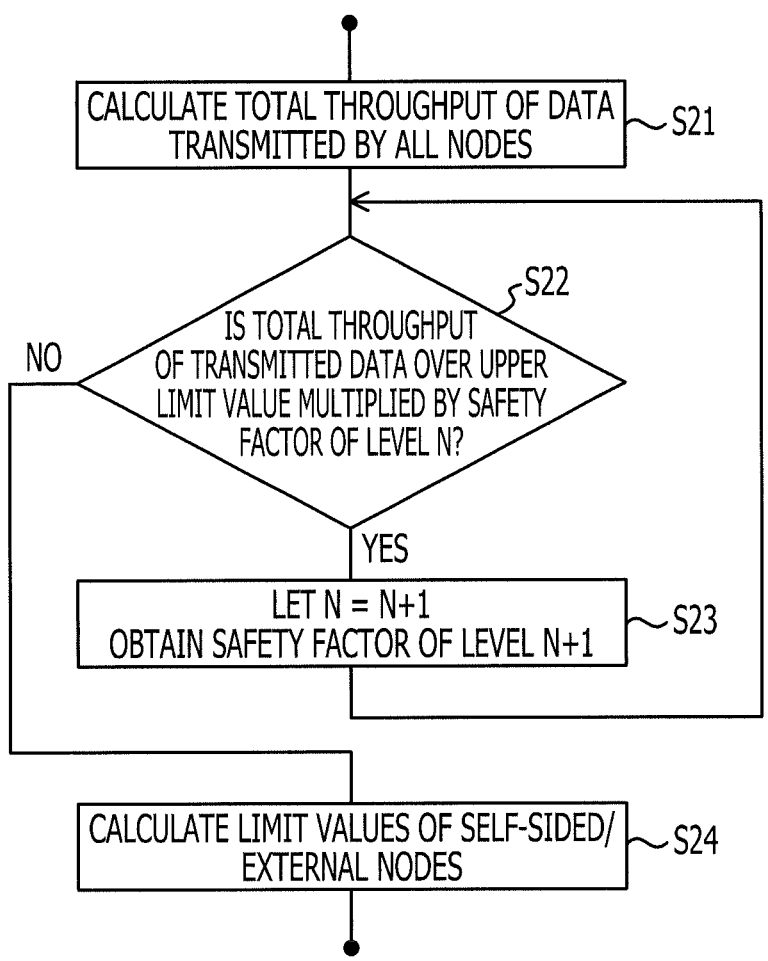
FIG. 12 depicts an exemplary process of a limit value calculator.

FIG. 12 depicts an exemplary process of a limit value calculator. The process depicted in FIG. 12 may be a process which is performed by the limit value calculator 23 in the operation S4 depicted in FIG. 6 when the margin rate for the total throughput of transmitted data changes. Before the process depicted in FIG. 12 starts, an integer N may be set to one.

The limit value calculator 23 adds up the throughput f data transmitted by all of the nodes in an operation S21 as depicted in FIG. 12. The limit value calculator 23 decides whether the total throughput of transmitted data exceeds the upper limit multiplied by the margin rate of a level N in an operation S22. If the total throughput of transmitted data exceeds the upper limit multiplied by the margin rate of the level N, the limit value calculator 23 incrementally updates the integer N by one in an operation S23. The limit value calculator 23 obtains the margin rate of the level N after being incrementally updated, and updates the margin rate of the self-sided node in the limit value table 27. The process goes to the operation S22.

Unless the total throughput of transmitted data exceeds the upper limit multiplied by the margin rate of the level N in the operation S22, the process goes to an operation S24. The limit value calculator 23 calculates the limit values of the self-sided and external nodes according to the equation (1).

Figure 13:
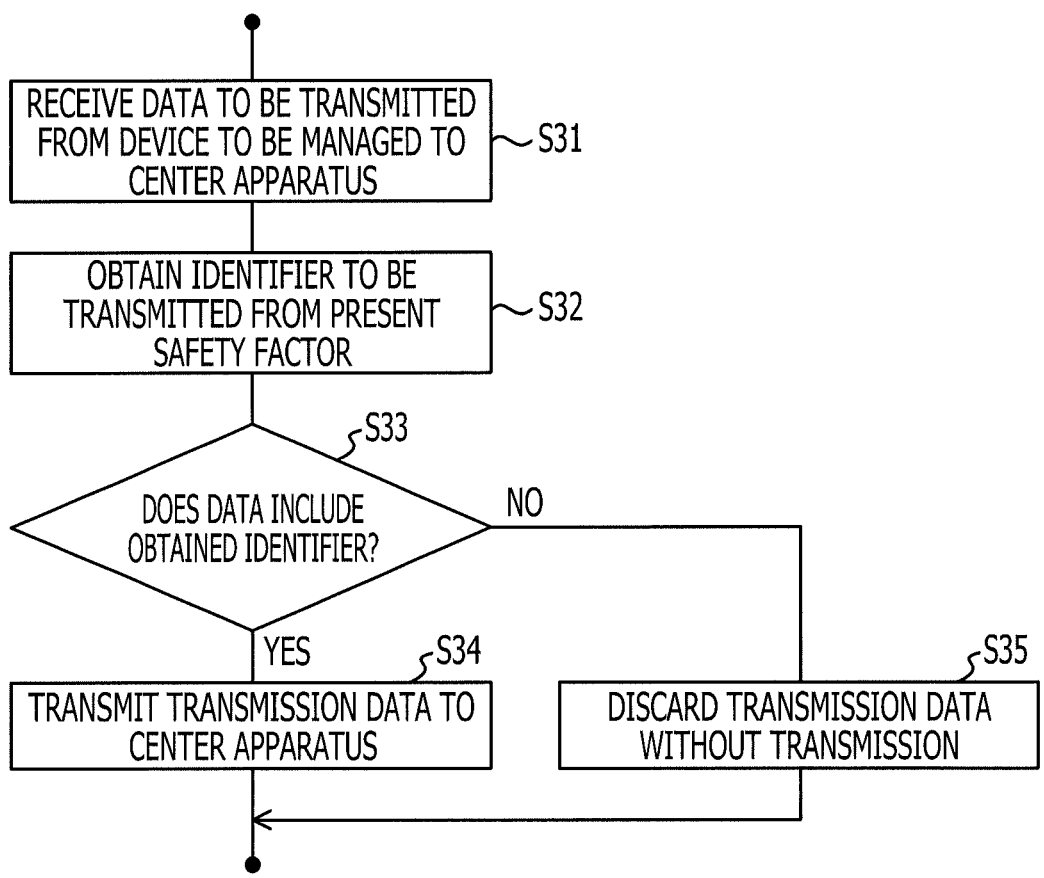
FIG. 13 depicts an exemplary process of a data transceiver.

FIG. 13 depicts an exemplary process of a data transceiver. The process depicted in FIG. 13 may be a transmission decision process which is performed by the data transceiver 21. The process depicted in FIG. 13 may be performed in response to receiving a packet including data such as a log or an alarm from the to-be-managed device, for example, receiving data to be transmitted to the center apparatus 40.

The data transceiver 21 receives data to be transmitted to the center apparatus 40 in an operation S31. The data transceiver 21 obtains an identifier indicating transmission from the data transmission decision table 28 based on the current margin rate (or its level) of the self-sided node in an operation S32.

FIG. 14 depicts an exemplary data transmission decision table. As depicted in FIG. 14, an identifier and a margin rate (level 1, 2 or 3) are set to each of entries corresponding to packet types of transmitted data, i.e., "Alarm (Alert)", "Alarm (Warning)", "Alarm (Info)", "Log level 1", "Log level 2", "Log level 3" and "Log level 4".

FIG. 15 depicts an exemplary identifier. An alarm/log type having a margin rate being higher than the current margin rate may be obtained as an identifier indicating transmission in an operation S32. If the current margin rate is 0.5 (level 1), the entries "Alarm (Alert)", "Alarm (Warning)", "Alarm (Info)", "Log level 1", "Log level 2", "Log level 3" and "Log level 4" each may be obtained as an identifier indicating transmission. If the current margin rate is 0.8 (level 2), the entries "Alarm (Alert)", "Alarm (Warning)", "Log level 1" and "Log level 2" each may be obtained as an identifier indicating transmission. If the current margin rate is 0.1 (level 3), the entries "Alarm (Alert)" and "Log level 1" each may be obtained as an identifier indicating transmission. Those conditions are depicted in FIG. 15.

After performing the operation S32, the data transceiver 21 decides in an operation S33 whether received transmission data includes an identifier indicating transmission obtained from the data transmission decision table 28. If the transmission data includes an identifier indicating transmission, the data transceiver 21 transmits the transmission data to the center apparatus 40 in an operation S34. If the transmission data includes no identifier indicating transmission, the data transceiver 21 discards the transmission data without transmitting the transmission data in an operation S35.

The communication apparatus does not transmit the throughput of transmitted data and the limit value to the external communication apparatus each time transmitting data. The communication apparatus transmits the throughput of transmitted data, the limit value and the margin rate to the external communication apparatus if the throughput of transmitted data exceeds the limit value. Thus, as the plurality of communication apparatuses each autonomously control a reference value of communication throughput, the communication apparatuses may communicate with one another less frequently, and the communication throughput may be reduced.

As the total throughput of data transmitted by all the communication apparatuses approaches to the upper limit, the current margin rate of the communication apparatus increases (or the level of the margin rate increases). As the margin rate increases (or the level of the margin rate increases), the data transceiver 21 discards larger size of transmission data. Thus, the total throughput of transmitted data may exceed the upper limit less frequently, and charges for network use for communication may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication apparatus comprising:
a first storage section configured to store a first communication throughput, a first reference value of the first communication throughput and a first reference adjustment value to adjust the first reference value for each of one or more another communication apparatuses and the communication apparatus;
a calculating section configured to determine that a current communication throughput between the communication apparatus and a center apparatus exceeds the first reference value of the communication apparatus, and in response to said determination, (i) to request the one or more another communication apparatuses to transmit a second communication throughput, a second reference value of the second communication throughput and a second reference adjustment value to the communication apparatus and (ii) to calculate a third reference value of each of the one or more another communication apparatuses and the communication apparatus based on the current communication throughput, the first reference value of the communication apparatus, the second communication throughput, the second reference value, the second reference adjustment value and the first reference adjustment value of the communication apparatus;
an updating section configured to update the first reference value in the first storage section with the corresponding third reference value for the one or more another communication apparatuses and the communication apparatus;
a transmitter section configured to transmit, to the one or more another communication apparatuses, the corresponding third reference value and a request to update a corresponding second storage section of the one or more another communication apparatuses with the corresponding third reference value; and
a receiver section configured to receive a calculated reference value transmitted from the one or more another communication apparatuses and update the corresponding first reference value in the first storage section with the calculated reference value.

2. The communication apparatus according to claim 1, wherein the one or more another communication apparatuses perform data transmission with the center apparatus via a network.

3. The communication apparatus according to claim 1, further comprising,
an obtaining section configured to determine that the current communication throughput exceeds the first reference value of the communication apparatus, and in response to said determination, to update the first reference value, the first communication throughput and the first reference adjustment value in the first storage section for each of the one or more another communication apparatuses and the communication apparatus, with a received reference value, a received communication throughput and a received reference adjustment value from one of another communication apparatus included in the one or more another communication apparatuses, wherein
the calculating section calculates a fourth value of each of the one or more another communication apparatuses based on the values of the updated first communication throughput and the updated first reference adjustment value.

4. The communication apparatus according to claim 1, further comprising,
a transmission setting section configured to set whether transmission data is transmitted from the communication apparatus to the center apparatus according to the first reference adjustment value of the communication apparatus stored in the first storage section.

5. The communication apparatus according to claim 1, wherein the first reference adjustment value is greater as a total of the first communication throughput of each of the one or more another communication apparatuses and the communication apparatus is greater.

6. A communication system comprising: a communication apparatus and one or more another communication apparatuses, each apparatus of the communication apparatus and the one or more communication apparatuses including:
a first storage section configured to store a first communication throughput, a first reference value of the first communication throughput and a first reference adjustment value to adjust the first reference value for each of one or more another communication apparatuses and the communication apparatus;
a calculating section configured to determine that a current communication throughput between said each apparatus and a center apparatus exceeds the first reference value of said each apparatus, and in response to said determination, (i) to request the one or more another communication apparatuses or the communication apparatus to transmit a second communication throughput, a second reference value of the second communication throughput and a second reference adjustment value to said each apparatus and (ii) to calculate a third reference value of each of the one or more another communication apparatuses and the communication apparatus based on the current communication throughput, the first reference value of said each apparatus, the second communication throughput, the second reference value, the second reference adjustment value and the first reference adjustment value of said each apparatus;
an updating section configured to update the first reference value in the first storage section with the corresponding third reference value for the one or more another communication apparatuses and the communication apparatus;
a transmitter section configured to transmit, to the one or more another communication apparatuses or the communication apparatus, the corresponding third reference value and a request to update a corresponding second storage section of the one or more another communication apparatuses or the communication apparatus with the corresponding third reference value; and
a receiver section configured to receive a calculated reference value transmitted from the one or more another communication apparatuses or the communication apparatus and update the corresponding first reference value in the first storage section with the calculated reference value,
wherein the communication apparatus and the one or more another communication apparatuses perform data transmission with the center apparatus via a network.

7. The communication system according to claim 6, wherein said each apparatus includes,
an obtaining section configured to determine that the current communication throughput exceeds the first reference value of said each apparatus, and in response to said determination, to update the first reference value, the first communication throughput and the first reference adjustment value in the first storage section for each of the one or more another communication apparatuses and the communication apparatus, with a received reference value, a received communication throughput and a received reference adjustment value from one of another communication apparatus included in the one or more another communication apparatuses,
wherein the calculating section calculates a fourth value of each of the one or more another communication apparatuses based on the values of the updated first communication throughput and the updated first reference adjustment value.

8. The communication system according to claim 6, wherein each of the one or more another communication apparatuses and the communication apparatus includes,
a transmission setting section configured to set whether transmission data is transmitted from the communication apparatus to the center apparatus according to the first reference adjustment value of the communication apparatus stored in the first storage section.

9. The communication system according to claim 6, wherein the first reference adjustment value is greater as a total of the first communication throughput of each of the one or more another communication apparatuses and the communication apparatus is greater.

10. A communication method comprising:
storing a first communication throughput, a first reference value of the first communication throughput and a first reference adjustment value to adjust the first reference value in a first storage section for each of one or more another communication apparatuses and a communication apparatus;
requesting the one or more another communication apparatuses to transmit a second communication throughput, a second reference value of the second communication throughput and a second reference adjustment value to the communication apparatus in response to determining that a current communication throughput between the communication apparatus and a center apparatus exceeds the first reference value of the communication apparatus;

calculating a third reference value of each of the one or more another communication apparatuses and the communication apparatus based on the current communication throughput, the first reference value of the communication apparatus, the second communication throughput, the second reference value, the second reference adjustment value and the first reference adjustment value of the communication apparatus;

updating the first reference value in the first storage section with the corresponding third reference value for the one or more another communication apparatuses and the communication apparatus;

transmitting, to the one or more another communication apparatuses, the corresponding third reference value and a request to update a corresponding second storage section of the one or more another communication apparatuses with the corresponding third reference value; and receiving a calculated reference value transmitted from the one or more another communication apparatuses and updating the corresponding first reference value in the first storage section with the calculated reference value.

11. The communication method according to claim 10, further comprising:

updating the first reference value, the first communication throughput and the first reference adjustment value in the first storage section for each of the one or more another communication apparatuses and the communication apparatus, with a received reference value, a received communication throughput and a received reference adjustment value from one of another communication apparatus included in the one or more another communication apparatuses, in response to determining that the current communication throughput exceeds the first reference value of the communication apparatus; and calculating a fourth value of each of the one or more another communication apparatuses based on the values of the updated first communication throughput and the updated first reference adjustment value.

12. The communication method according to claim 10, further comprising:

setting whether transmission data is transmitted from the communication apparatus to the center apparatus according to the first reference adjustment value of the communication apparatus stored in the first storage section.

13. The communication method according to claim 10, wherein the first reference adjustment value is greater as a total of the first communication throughput of each of the one or more another plurality of communication apparatuses and the communication apparatus is greater.

* * * * *